(12) United States Patent
St. Denis

(10) Patent No.: US 7,044,699 B1
(45) Date of Patent: May 16, 2006

(54) ADJUSTABLE EXTENDED LOAD STABILIZER FOR VEHICLE TAILGATES

(75) Inventor: Mark Andrew St. Denis, Easley, SC (US)

(73) Assignee: Mark A. St. Denis, Pickens, SC (US)

( * ) Notice: Subject to any disclaimer, the term of this patent is extended or adjusted under 35 U.S.C. 154(b) by 0 days.

(21) Appl. No.: 11/051,899

(22) Filed: Feb. 5, 2005

(51) Int. Cl.
*B60P 7/06* (2006.01)

(52) U.S. Cl. .......................... 410/34; 410/42

(58) Field of Classification Search ........... 410/34, 410/77, 31, 32, 33, 36, 37, 38, 42, 47, 48, 410/49, 13, 121; 296/3; 211/13.1; 224/403
See application file for complete search history.

(56) References Cited

U.S. PATENT DOCUMENTS

| | | | | |
|---|---|---|---|---|
| 1,342,654 A | * | 6/1920 | Torgerson | 410/37 |
| 4,650,383 A | * | 3/1987 | Hoff | 410/149 |
| 4,737,056 A | * | 4/1988 | Hunt | 410/151 |
| 4,772,165 A | * | 9/1988 | Bartkus | 410/139 |
| 5,971,685 A | * | 10/1999 | Owens | 410/151 |
| 5,997,228 A | * | 12/1999 | Potter | 410/155 |
| 6,210,087 B1 | * | 4/2001 | Bacon | 410/35 |
| 6,237,824 B1 | * | 5/2001 | Bagley | 224/521 |
| 6,238,154 B1 | * | 5/2001 | DaPrato | 410/151 |
| 6,517,134 B1 | * | 2/2003 | Armstrong | 296/3 |
| 6,752,301 B1 | * | 6/2004 | Drolet | 224/405 |
| 2005/0074307 A1 | * | 4/2005 | Guarisco et al. | 410/36 |

* cited by examiner

*Primary Examiner*—H Gutman
(74) *Attorney, Agent, or Firm*—Derek S. Chastain

(57) ABSTRACT

An adjustable load stabilizer secures loads of any size within the width of the track carried in a cargo bed of a truck or SUV and which extend beyond the vehicle tailgate, while not interfering with the operation of the tailgate or cargo bed when permanently installed. The load stabilizer comprises two brackets which are mounted to the vehicle tailgate and which support a traversing track which is offset from the tailgate by 3 inches, mounted parallel to and lower than the top of the tailgate. Two travelling arm carriers move freely along the length of the traversing track, each supporting a collapsible arm. The travelling arm carriers are moved into position to stabilize the extended load and the collapsible arms are then raised. Raising the collapsible arms creates an interference fit with the traversing track thus securing the arms in the upright position. The arms thus prevent the extended load from sliding around the cargo bed during transport.

5 Claims, 6 Drawing Sheets

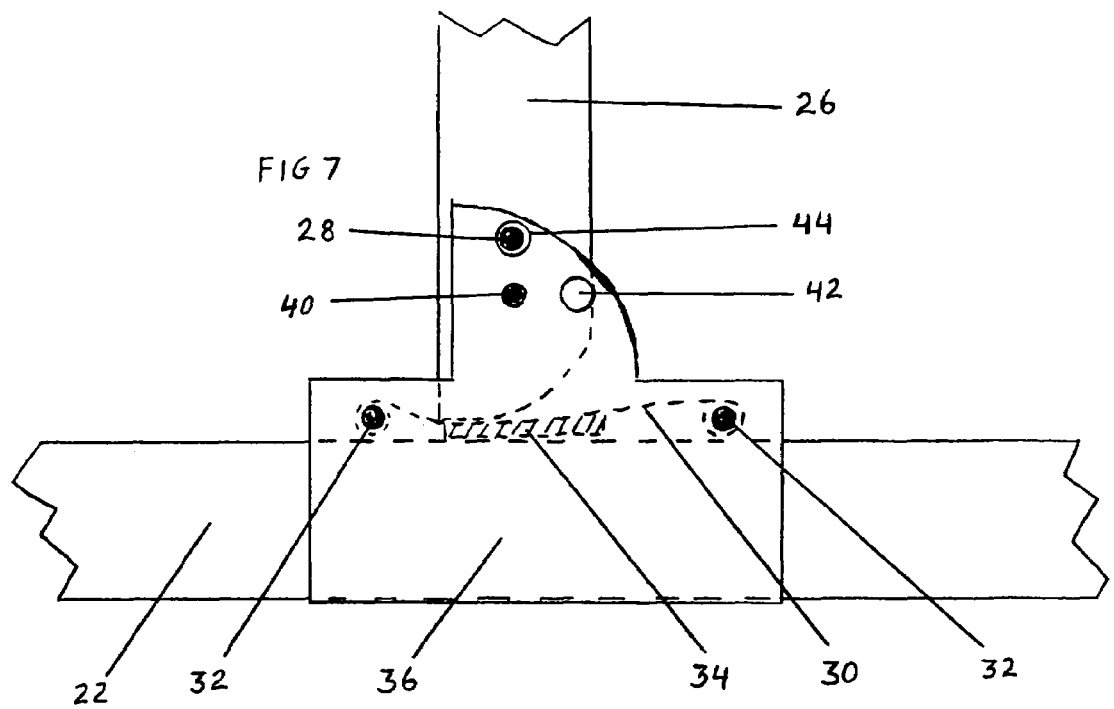
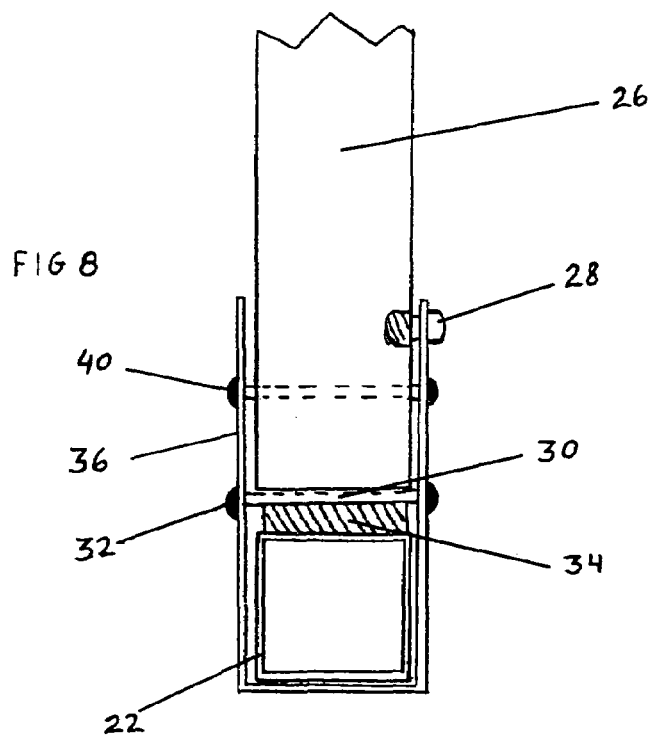

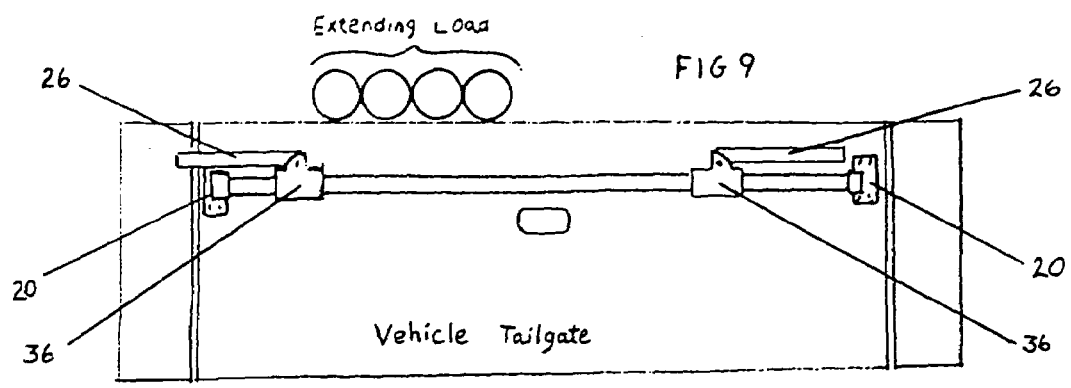
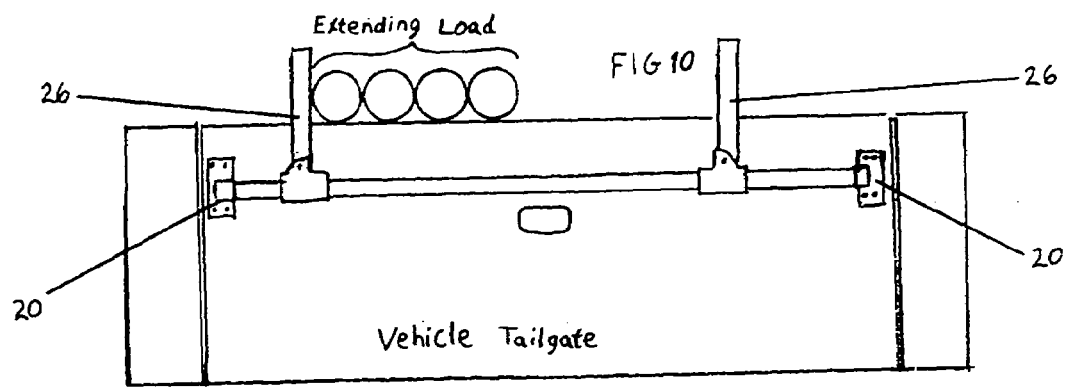
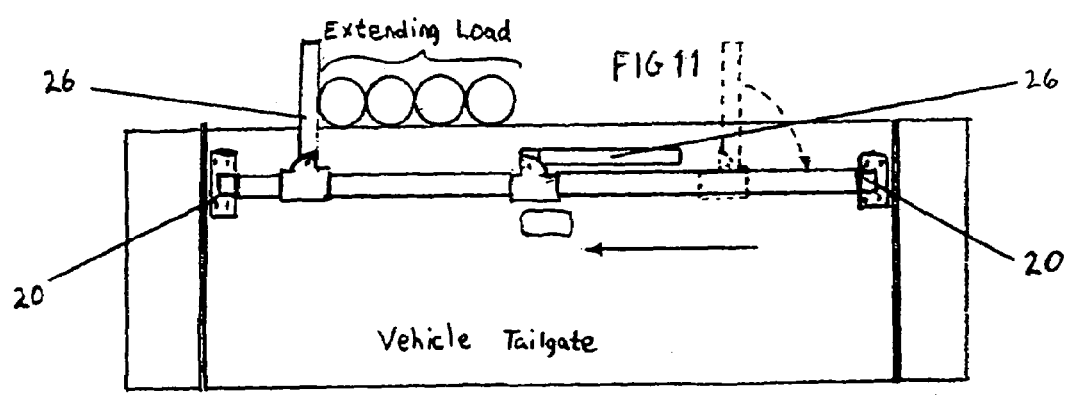
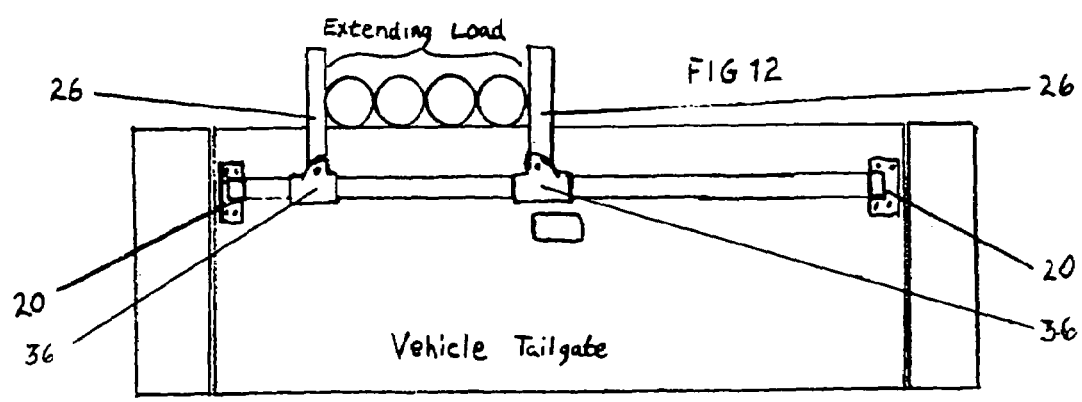

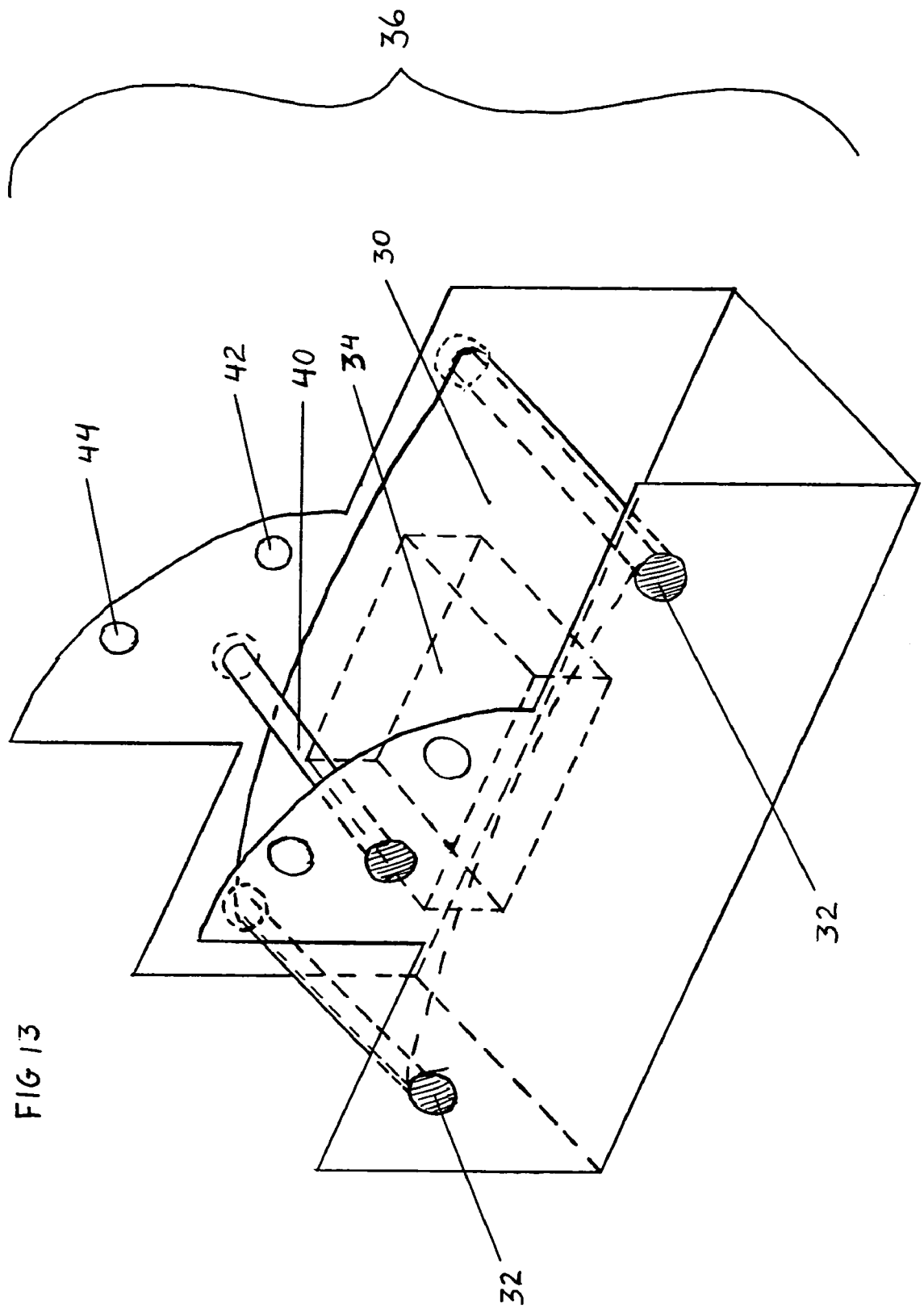

ADJUSTABLE EXTENDED LOAD STABILIZER FOR VEHICLE TAILGATES

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of Invention

The invention relates to a device that secures a load in the bed of a pickup truck or SUV, specifically a load that extends beyond the tailgate by use of a pair of easily adjustable stabilizer arms that don't interfere with the operation of the tailgate or cargo bed and can be adjusted to hold any size item anywhere within the width of the track.

2. Prior Art

Contractors and "do-it-yourselfers" commonly load objects in their pickup truck beds that extend beyond the closed tailgate of the truck, necessitating the securing of the load so that it doesn't slide around and fall out of the truck. This is necessary because the load is sitting on top of the closed tailgate. Examples of such a load are pipes, cut lumber, logs, and various sheet load such as OSB or sheetrock.

Most often such a load is secured by means of bungee cords, ropes, or straps, which are cumbersome, time-consuming, and may possibly present hazards during use. Bungee cords come in many lengths, requiring one to carry a variety of cords because the size of the load may not be known prior to loading. When using bungee cords, one must secure one end of the cord and then attempt to wrap the cord around the load and then secure the other end of the cord. This process is both time-consuming and frustrating. There are occasions when two or more bungee cords must be connected to each other to achieve the desired effect. Bungee cords have metal hooks on each end and it is sometimes necessary to place such stress on the cord that reaching the anchoring position with the hook can pinch fingers. During the process of pulling on the cord to stretch it, one can lose their grip on the cord and it can suddenly whip through the air, creating a potentially dangerous situation. Consequently, disengaging the cord is also difficult.

Ropes are by nature difficult to use because one must have a convenient location on which to secure the rope, which many vehicles don't have. One must also know how to tie knots that are then hard to remove once the transport is complete. Again, the rope must be wrapped around the load to properly secure it, which is a time-consuming process. Ropes naturally aren't tensioned, and therefore must have sufficient tension applied in order to properly secure a load. This requires pulling the rope taught prior to tying a knot, during which process some tension can be lost. The size of the load is not always known in advance, and so therefore one must carry a long length of rope to account for a potentially larger load. The length of rope not used then makes tying a knot much more difficult and time-consuming.

Straps also must have a convenient location on which to be secured, potentially damaging the vehicle when improperly used and placing excessive tension on the strap which can be dangerous. Straps become frayed with time due to exposure and must be replaced regularly to insure one's safety. Two types of straps are commonly used; ratcheting straps and cinch straps. Both types of straps are time-consuming and difficult to use properly.

Other attempts have been made to address these problems. Most often, this involved carrying a load by placing the front end on top of the cab of a truck by use of some rack device and using a rack on the tailgate or side of the truck bed to support the back end of the load at the same height as the front, commonly called "roof-height carriers". Most often, such racks are seen on commercial utility vehicles or work vehicles. Thus the owner of a multi-purpose vehicle has the option of driving around with a heavy, cumbersome rack system attached to his or her truck that may or may not be removable. If the rack system is removable then it must be stored for future use. Also, such a rack system isn't even usable in an SUV. Even when using such a rack system, the racks aren't fully adjustable and therefore load may still slide around during transport if not secured by some other means.

U.S. Pat. No. 6,648,391 entitled "Truck bed extension device" which issued on Nov. 18, 2003 to Whiteford, et al. describes a device used to support loads that overhang the vehicle cargo bed structure. However, it is quite complicated in that it utilizes a deck, a support structure, and a signaling system which is necessary because the device obstructs the view of the vehicles tail light assemblies. This design makes the invention undesirable for the average vehicle owner.

U.S. Pat. No. 6,752,301 entitled "Collapsible rack for use in truck beds" which issued on Jun. 22, 2004 to Drolet shows an adjustable rack system contained within the bed of a truck.

U.S. Pat. No. 5,439,152 entitled "Extendable Carrier Rack for Pick-up Trucks" which issued on Aug. 8, 1995 to Campbell depicts an extendable carrier rack for pickup trucks.

U.S. Pat. No. 5,476,301 entitled "Cargo Securing System Including an Adjustable and Extensible Rack for Trucks" which issued on Dec. 19, 1995 to Berkich provides a cargo securing system including an adjustable and extensible rack for pickup trucks.

U.S. Pat. No. 6,662,983 entitled "Multi-configuration, multi-purpose rack system" which issued on Dec. 16, 2003 to Lane and Lean shows a rack system with multiple configurations.

U.S. Pat. No. 6,517,134 entitled "Vehicle utility rack system providing elevated hauling and working stations" which issued on Feb. 11, 2003 to Armstrong describes a device which may be used to support loads extending beyond the tailgate of a vehicle with a cargo bed.

U.S. Pat. No. 6,237,824 entitled "Rack system for a vehicle" which issued on May 29, 2001 to Bagley shows a rack system which attaches to a trailer hitch and can be used to support extending loads.

None of the known prior art discloses the device set forth herein, which is superior for several reasons. The prior art designs typically interfere with the operation of tailgate, cargo bed, or both when installed on the vehicle. In order to properly utilize the tailgate or cargo bed, the devices must be removed from the vehicle. The prior art designs are bulky, with multiple parts that must be broken down and stored. The prior art designs do not allow for an infinite amount of load locking positions, which in many cases forces the user to secure loads with rope, bungee cords or tie down straps. In addition, the prior art designs often rely on pins to secure adjustable features, which are easily lost.

OBJECTS AND ADVANTAGES

Accordingly, several objects and advantages of the invention are:

(a) to provide a device that is easily used with a personal (or commercial) vehicle;

(b) to provide a device that is easily and conveniently stored until needed;

(c) to provide a device that readily adapts to any size load to be carried within the width of the track;

(d) to provide a device that can be used by the average person quickly and easily;

(e) to provide a device that is safer to use while securing the load due to lack of tension within the device;

(f) to provide a device that may be used on the tailgates of both trucks and SUVs;

(g) to provide a device that doesn't interfere with the operation of the tailgate or cargo bed when the device is permanently attached to the vehicle.

Further objects and advantages are to manufacture a device that is simple to use and can be manufactured and sold economically, thus allowing a large percentage of the consumer market to purchase and use the device. The device won't rust, is light-weight, doesn't have an intrusive appearance on the vehicle, and will last for many years due to the load from which the device is made. Also, the device doesn't use pins, which are easily lost and take more time to manipulate. The adjustable arms of the invention allow a more precise fit on the load, thus allowing for better stabilization. Further objects and advantages will become apparent from a consideration of the ensuing description and drawings.

SUMMARY

The present invention solves the inherent problems and disadvantages of the prior art by providing an easily adjustable apparatus attached to the vehicle tailgate which allows a load extending beyond and over the tailgate to be stabilized without use of cords, ropes, or straps, and does so without interfering with the normal operation of the tailgate or cargo bed when installed on the vehicle. The device consists of a square aluminum track mounted horizontally near the top of the vehicle tailgate by means of two mounting brackets that allow the track to stand off from the tailgate surface so as not to interfere with the tailgate opening lever. Two traveling arm assemblies can be easily moved to any width to accommodate the load and then locked into place with little effort. The load is thus stabilized for transport.

DRAWINGS—FIGURES

Figure 1:
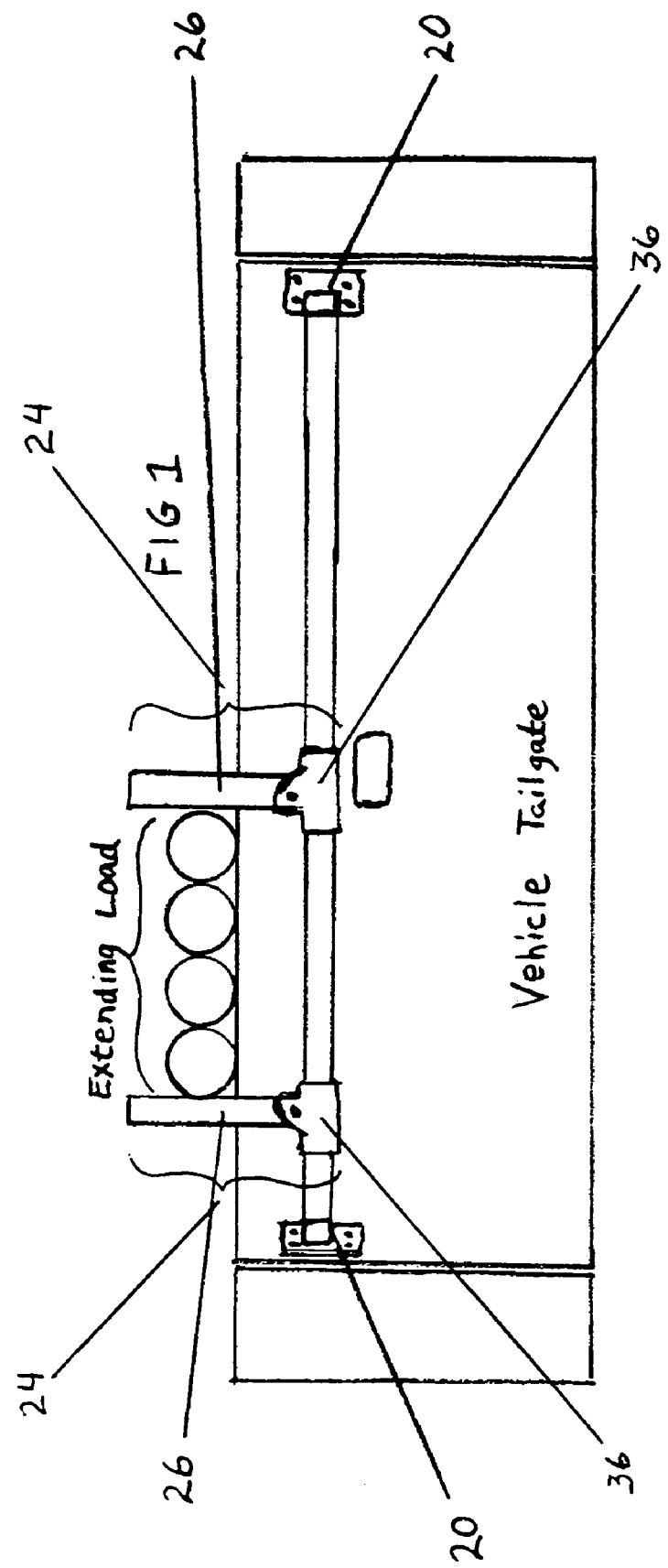
FIG. 1 shows the invention as mounted as viewed looking at the back of the vehicle tailgate with the adjustable arms in the "up" position, with circles representing the extended load.
Figure 2:
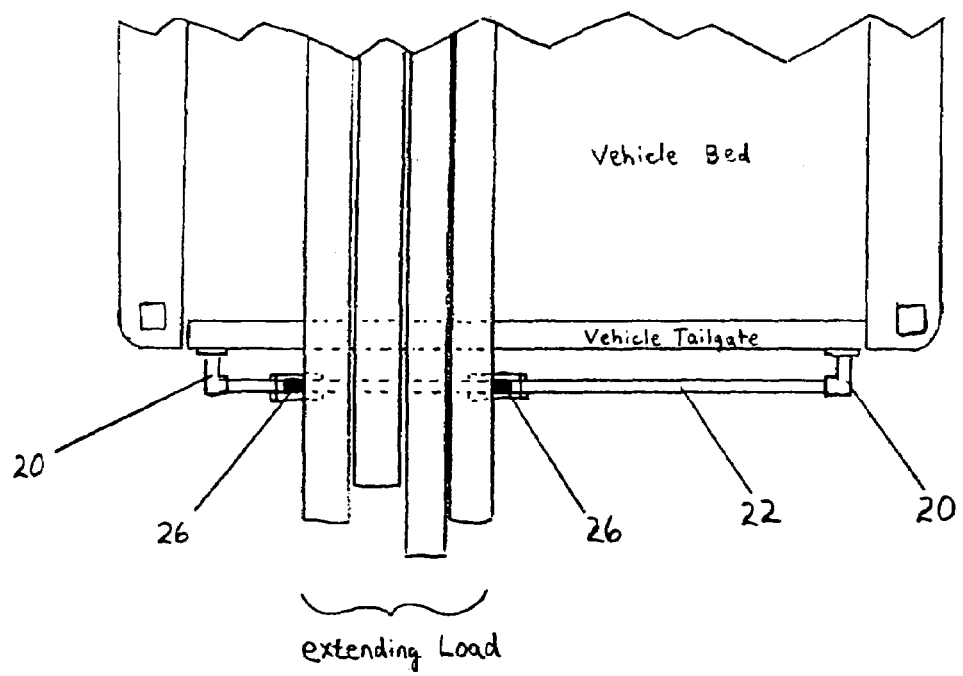
FIG. 2 shows the invention mounted as viewed looking down at the back of the tailgate of the vehicle with the adjustable arms in the "up" position, securing the extended load. This is a top of view of the same configuration as FIG. 1.
Figure 3:
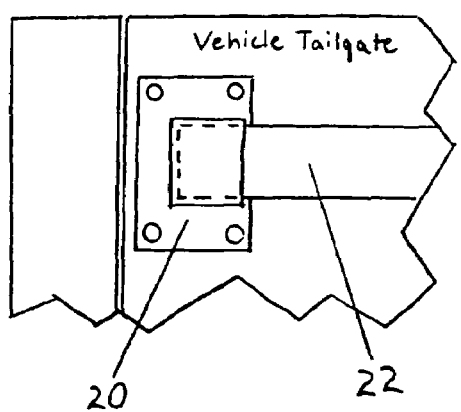

FIG. 3 provides a detailed view of a mounting bracket, as viewed looking at the back of the vehicle.

Figure 4:
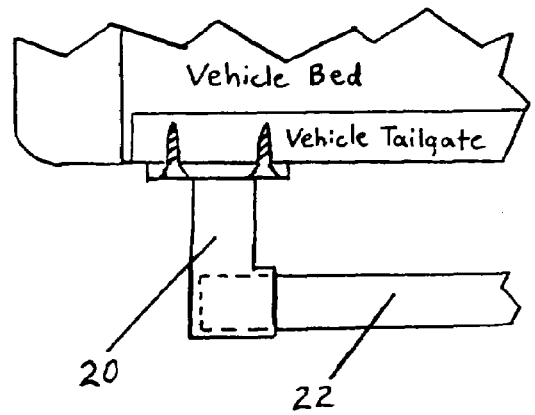

FIG. 4 shows a detailed view of how a mounting bracket functions to make the traversing track stand off from the back of the tailgate as viewed from above. This is a top view of the same configuration as FIG. 3.

Figure 5:
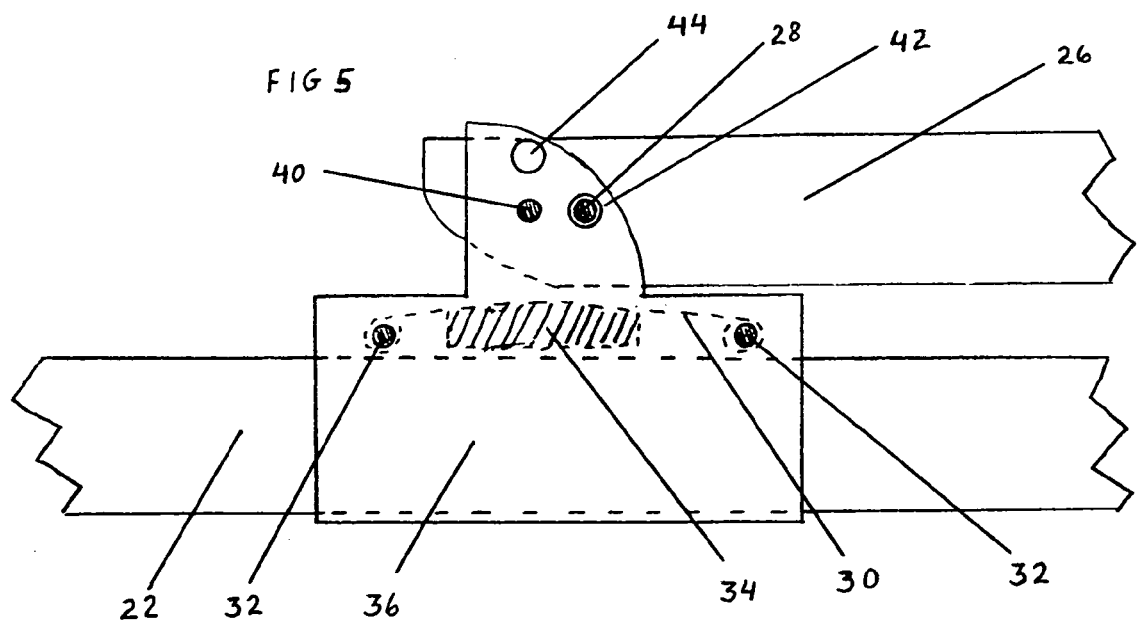

FIG. 5 is a detailed view of the travelling arm assembly in a frontal view with the collapsible arm in the "down" position.

Figure 6:
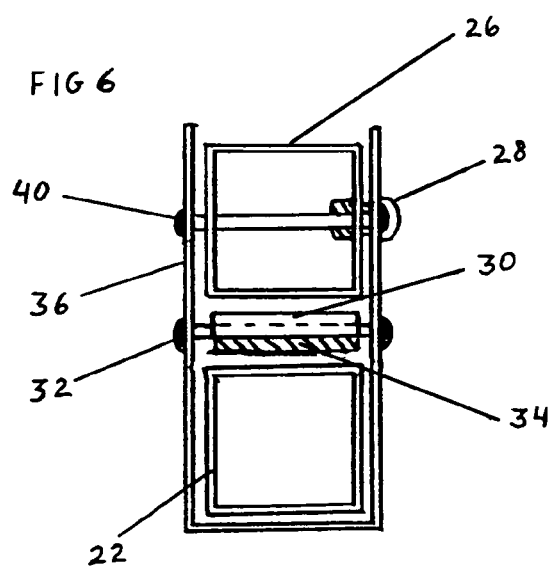

FIG. 6 is a detailed view of the travelling arm assembly in an end view with the collapsible arm in the "down" position.

FIG. 7 is a detailed view of the travelling arm assembly in a frontal view with the collapsible arm in the "up" position.

FIG. 8 is a detailed view of the travelling arm assembly in an end view with the collapsible arm in the "up" position.

FIG. 9 shows the invention as mounted as viewed looking at the back of the tailgate of the vehicle with the collapsible arms in the "down" position, with circles representing the extended load.

FIG. 10 shows the invention as mounted as viewed looking at the back of the tailgate of the vehicle with the collapsible arms in the "up" position, with circles representing the extended load.

FIG. 11 shows the invention mounted as viewed looking at the back of the tailgate of the vehicle with one collapsible arm in the "up" position and the other in the "down" position being moved to secure the extended load, represented by the circles.

FIG. 12 shows the invention as mounted as viewed looking at the back of the tailgate of the vehicle with both collapsible arms in the "up" position securing the extended load, represented by the circles.

FIG. 13 is an isometric view of the travelling arm carrier.

| DRAWINGS - REFERENCE NUMERALS | |
|---|---|
| 20 mounting bracket | 22 traversing track |
| 24 travelling arm assembly | 26 collapsible arm |
| 28 spring plunger | 30 leaf spring |
| 32 spring bushings | 34 rubber grip pad |
| 36 travelling arm carrier | 40 pivot pin |
| 42 lower hole | 44 upper hole |

DETAILED DESCRIPTION—PREFERRED EMBODIMENT—FIGS. 1–8

A preferred embodiment of the present invention is illustrated in FIGS. 1–8. The device uses two mounting brackets 20 to mount a traversing track 22 to the tailgate of the vehicle. The mounting brackets 20 are constructed of cast aluminum and are designed so that they can be mounted to the vehicle tailgate by means of metal screws. The traversing track 22 then fits into a cast square hole in the mounting bracket 20, so that when both mounting brackets 20 are mounted the traversing track 22 is positively retained by the mounting brackets 20. FIGS. 3–4 show a detailed application of the mounting brackets.

The traversing track 22 is constructed of 1" square hollow aluminum extrusion and either end of the traversing track 22 fits into milled square holes in the mounting brackets 20. The traversing track 22 is thus separated from the rear surface of the vehicle tailgate by a space of approximately 3 inches. The traversing track 22 is mounted horizontally and thus in parallel with the top of the tailgate and approximately 3 inches lower than the top of the tailgate. It embodies the same concept as a towel bar mounted to a bathroom wall. The mounting brackets 20 and traversing track 22 thus form the stationary base of the invention.

As best seen in FIGS. 5–8, two travelling arm assemblies 24 are attached to the traversing track 22 by means of a travelling arm carrier 36. The travelling arm carrier 36 is a bracket which is manufactured by forming sheet steel so that the bottom and sides of the travelling arm carrier 36 are only slightly larger than the 1" square shape of the traversing track 22, which is shown in FIGS. 6 and 8. The sides of the travelling arm carrier 36 extend above the upper surface of the traversing track 22 providing sufficient space for two spring bushings 32, which are attached through the sides of the travelling arm carrier 36, thus securing the travelling arm carrier 36 around the traversing track 22, yet still allowing the travelling arm carrier 36 to move freely along the traversing track 22. When viewed from the end as in FIGS. 6 and 8 the travelling arm carrier 36 surrounds the traversing track 22 like a "U". When viewed from the front as in FIGS. 5 and 7 the travelling arm carrier 36 extends upward in the middle to support the collapsible arm 26.

As shown in FIGS. 5 and 7, each travelling arm carrier 36 uses the spring bushings 32 to support a leaf spring 30, to the bottom of which is attached a rubber grip pad 34. The leaf spring 30 is arched upwards in its relaxed state, thus raising the rubber grip pad 34 as in FIG. 5.

Each travelling arm carrier 36 extends above the traversing track 22, and then protrudes upward in the middle to form the supports for the collapsible arm 26. The collapsible arm 26 is attached within the sides of the travelling arm carrier 36 by means of a pivot pin 40, which is attached to one side of the travelling arm carrier 36, extends through the collapsible arm 26 and is then attached to the other side of the travelling arm carrier 36. The collapsible arm 26 is constructed of 1" square aluminum extrusion. FIGS. 5–8 show how the collapsible arm 26 is attached to the travelling arm carrier 36 using the pivot pin 40.

The bottom of the collapsible arm 26 as shown in FIGS. 5 and 7 is machined so that so that one side of bottom is a radius instead of a right angle. This allows the collapsible arm 26 to be in contact with the leaf spring 30 when in the "up" position, and to disengage the leaf spring 30 when in the "down" position. FIGS. 5 and 7 show the location and function of the spring plunger 28. A spring plunger 28 is used to secure the collapsible arm 26 in both the "up" and "down" positions. The spring plunger 28, in its relaxed state, extends through holes drilled in the sides of the travelling arm carrier 36 and locks into place. Thus the collapsible arm 26 in its "down" position may not be raised because the spring plunger 28 blocks it by protruding into the lower hole 42. When the spring plunger 28 is pushed into its compressed state, the collapsible arm 26 may be raised until such point as the upper hole 44 aligns with the compressed spring plunger 28, which then releases into the upper hole 44 thus securing the collapsible arm 26 in its "up" position.

OPERATION—PREFERRED EMBODIMENT—FIGS. 5–12

FIG. 9 shows the invention with the collapsible arms 26 in their "down" position, which doesn't interfere with the operation of the vehicle tailgate. The invention is thus easily accessible to the user and is always ready for use. In this figure the load extending beyond the tailgate is represented by the circles. The invention does not interfere with the user's ability to open the tailgate of the vehicle. When the collapsible arms 26 are in the "down" position, the travelling arm carrier 36 moves easily along the traversing track 22 with minimal hand pressure, thus the collapsible arms 26 may be moved to any position along the traversing track 22 easily and quickly. The actual operation of the collapsible arm 26 itself will follow later.

FIG. 10 shows the invention with collapsible arms 26 in their "up" or locked position. In this view the collapsible arm 26 on the left is now securing the load on one side.

FIG. 11 portrays the collapsible arm 26 on the right side being collapsed into its "down" position and the travelling arm carrier being moved toward the load, represented by the circles.

FIG. 12 depicts the travelling arm carrier 36 after being moved and the collapsible arm 26 now in its "up" position and in correct position to secure the load. It should be noted that both collapsible arms 26 can be moved in a matter of seconds and now brace the load on either side, thus securing the load for transport.

FIGS. 5 and 7 show the preferred embodiment of the operation of the collapsible arm 26. FIGS. 5 and 6 show the collapsible arm 26 in its "down" position. When the collapsible arm 26 is in the "down" position the travelling arm carrier 36 moves freely along the traversing track 22 with only minimal hand pressure. The travelling arm carrier 36 moves freely because the leaf spring 30 is in its relaxed state and is thus arched upwards, pulling the attached rubber grip pad 34 away from the traversing track 22. The collapsible arm 26 is held in place by the spring plunger 28 which is in its relaxed state thus protruding into the lower hole 42 drilled into the travelling arm carrier 36 thereby securing the collapsible arm 26 in the "down" position.

FIGS. 7 and 8 depict the collapsible arm 26 in its "up" position. One side of the bottom of the collapsible arm 26 is machined to a radius instead of a right angle. The collapsible arm 26 may pivot until the flat bottom surface of the collapsible arm 26 pushes down on the leaf spring 30 thus engaging the rubber grip pad 34 with the traversing track 22, thereby locking the entire assembly in place so that it may support a load placed on it from the side. In order to move the collapsible arm 26 into its "up" position one must push the spring plunger 28 into its tensioned state thus releasing it from the lower hole 42 in the travelling arm carrier 36. When the collapsible arm 26 reaches its "up" position the spring plunger 28 comes into alignment with the upper hole 44 drilled into the side of the travelling arm carrier 36. The spring plunger 28 then relaxes and protrudes into the upper hole 44 thus securing the collapsible arm 26 in its "up" position.

When the user is ready to put the collapsible arm 26 back in its "down" position, the user pushes the spring plunger 28 thus allowing the collapsible arm 26 to be moved down until such point as the spring plunger 28 aligns with the lower hole 42 in the side of the travelling arm carrier 36. At this point the spring plunger 28 will pop out thus securing the collapsible arm 26 in the "down" position and allowing the travelling arm carrier 36 to freely move along the traversing track 22.

CONCLUSION, RAMIFICATIONS, AND SCOPE

Accordingly, the reader will see that according to the invention, there is provided an economical and effective device that can easily and quickly be used by anyone for securing a load extending beyond the vehicle tailgate while not interfering with the operation of the tailgate or cargo bed and that can be adjusted to any size load within the width of the track.

While the above description contains many specificities, these should not be construed as limitations on the scope of the invention, but rather as an exemplification of the presently preferred embodiment thereof. Many other ramifications and variations are possible within the teachings of the invention. For example, the invention could be constructed of another load such as steel or PVC, or a different size of the same load. The elements of the invention could be made in tubular rather than square form. The arms could be of differing length. A different method could be employed for releasing and locking the collapsible arms. The arms could be telescoping instead of pivoting. The invention could be mounted in a different location, such as the top or inside of the tailgate. It could be possible to lock the travelling arm carrier in place by different means such as a gripping feature. The traversing track could be mounted to the tailgate by some means other than the described brackets. A hinge could be employed on the collapsible arms so that the invention could be used with the vehicle tailgate in the "down" position. The invention could be used on production vehicles as part of a vehicle design rather than as an after market product.

Accordingly, the scope of the invention should be determined not by the embodiments given, but by the appended claims and their legal equivalents.

The invention claimed is:

1. A device for use with a vehicle with a cargo bed structure to secure items being carried in said cargo bed structure which extend beyond the tailgate, the device comprising:

two arms that can be quickly and easily adjusted and secured,
   a track along which said arms may move,
   whereby said device may be used to secure said items being carried in said cargo bed structure;
   wherein said arms may be pivoted into an upright position thus locking said arms in place at any location on said truck.

2. The device of claim 1 wherein said track is manufactured from any suitable material, including metals and plastics.

3. The device of claim 1 wherein said arms are attached to a travelling arm carrier which allows said arms to move freely along said track.

4. The device of claim 1 wherein said track is attached to said vehicle tailgate by means of brackets.

5. A device for use with a vehicle with a cargo bed structure to secure items being carried in said cargo bed structure which extend beyond the tailgate, the device comprising:

two arms that can be quickly and easily adjusted and secured,
   a track along which said arms may move,
   whereby said device may be used to secure said items being carried in said cargo bed structure;
   wherein said arms create a friction fit with said track when pivoted into an upright position by use of a leaf spring and rubber grip pad.

* * * * *